Sept. 18, 1962 W. C. CORRIGAN, JR 3,054,476
BRAKE CONTROL MECHANISM
Filed Jan. 12, 1961
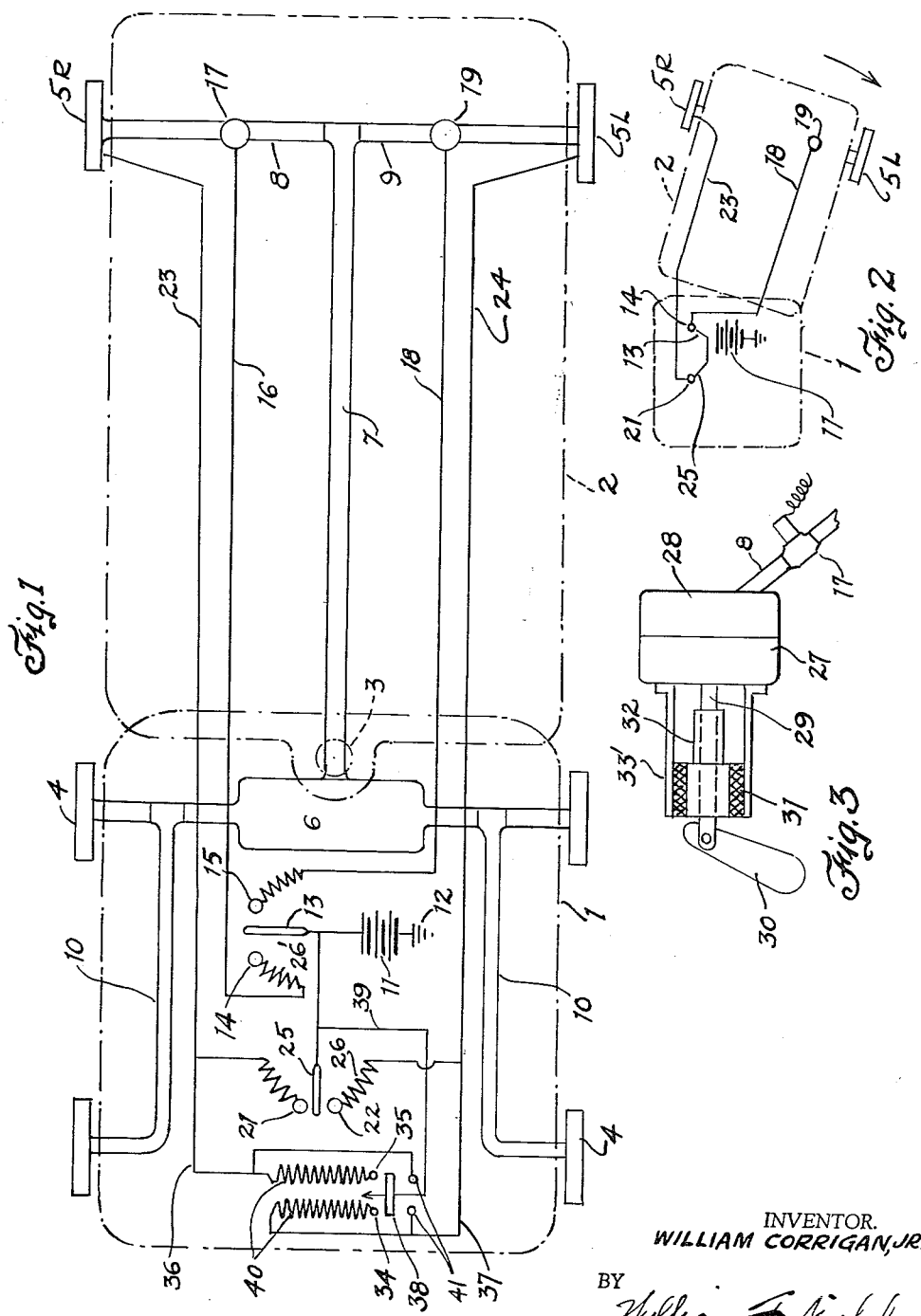
INVENTOR.
WILLIAM CORRIGAN, JR.
BY
William Nickel
ATTORNEY 3,054,476
BRAKE CONTROL MECHANISM
William C. Corrigan, Jr., 734 58th St., New York, N.Y.
Filed Jan. 12, 1961, Ser. No. 82,304
2 Claims. (Cl. 188—3)

My invention is an improvement in controlling apparatus for the brakes of motor vehicles, and especially commerical trucks.

An important object of the invention is to provide controlling apparatus for brakes on trailer trucks, adapted to enable the vehicle to make rearward turn in a short space; as, for example, when the truck must be backed up to a curb or other point for loading and unloading. At such time, the apparatus will cause the brakes to hold stationary one of the rear wheels on the truck, but will leave the rear wheel on the opposite side free; so that the trailer can easily be swung around the wheel which is held fast by the apparatus.

It is well known that brakes generally employed on automobiles and trucks are for reducing speed and for bringing the vehicle to a stop by operation of all brakes at once. The chief object of this invention is to provide auxiliary apparatus which will enable the brakes to act on one rear wheel only of the truck and prevent rotation thereof. Thus, the truck can be easily shifted bodily around the place occupied by said rear wheel as a pivot.

Another object is to provide auxiliary mechanism for managing the system of brakes on a truck which will easily and surely keep either one of the rear wheels motionless when the truck is manoeuvred into position to receive or discharge a load. With large trucks comprising both tractor and trailer sections, such a performance is quite troublesome and requires a good deal of room. Frequently several attempts at backing are required before the vehicle has the required position and stands where it is needed. My improvement eliminates this difficulty and enables the driver to swing the rear end of his vehicle any way he wants it without having to pull out and try again, even when the space at his disposal is quite restricted.

Another object of the invention is to provide apparatus for controlling the brakes of a truck, especially when the truck comprises a tractor pivotally connected to a trailer; so as to hold the trailer directly behind the tractor at all times on downgrades as well as upgrades on a street or highway. Very often, especially when the trailer is heavily loaded and the truck is being driven downgrade on a stretch of road, the trailer may swing to one side about its pivotal coupling with the tractor. This derangement is known as "jack-knifing," and unless the sidewise movement of the rear end of the trailer is checked, it may pull the truck off the hard surface of the roadway, or it may overturn and wreck the vehicle. With my apparatus for controlling the brakes, the wheel on the one side of the trailer which is swinging out sidewise in relation to the tractor, can be checked or locked, so as to stop the veering movement of the trailer in that direction; while the wheel on the opposite side is left free. The locked wheel thus exerts a sufficient drag on one side of the trailer so that it will readily move back into straight alinement with the tractor, and damage is thus avoided.

In its preferred form, my invention comprises apparatus for controlling the well-known conduits through which the actuating fluid is directed to put on the brakes, and it has the form of valves and electric circuits for obstructing either of the conduits for supplying actuating fluid leading to the two rear wheels of the trailer. If the power fluid is then applied, it acts on one of the brakes to hold the rear wheel at one side, but cannot effect the rear wheel on the opposite side of the trailer; and this operation is useful for either correcting a jack-knifing swing of the trailer, or for backing the trailer as above stated.

The apparatus also comprises auxiliary means for magnetically actuating the brakes for either regular driving or so as to prevent and correct jack-knifing, or to achieve the backing of the truck. Sometimes, the conduits leading from the source of pressure fluid to the brakes sustain rupture, especially when such conduits are hose lines. In that case, the brakes, of course, cannot be worked, and a serious crisis then faces the driver. My invention provides magnetically operated members and circuits which are controlled by the driver so that if the regular system of brakes thus undergoes damage, the brakes can still be fully utilized as before and made to produce the necessary operative effect in all of the situations above-mentioned.

Other objects and the nature and advantages of my invention are made clear in the following description, and the drawings present the best form of the invention now known to me. But this disclosure is by way of example only and changes not shown herein may be made without deviation from the principle of the invention or material alteration of any of the essential characteristics as defined in the appended claims.

On the drawings, FIGURE 1 is an outline in plan of a truck with regular braking system and my invention attached thereto.

FIGURE 2 illustrates a truck comprising a tractor and trailer, with the trailer beginning to swing sidewise, showing the means for correcting this situation.

FIGURE 3 shows a detail of the apparatus.

FIGURE 1 is a top plan view of a commercial truck comprising a tractor 1, and a trailer 2, which has its front end connected to the rear of the tractor by means of pivotal coupling means indicated at 3. The trailer and tractor are shown in outline only. The tractor has wheels 4, two at each side, and the trailer is provided with wheels at each side near the rear end indicated at 5R and 5L. The brakes adjacent said wheels are constructed and connected to be actuated by fluid under pressure supplied from a tank 6, such as compressed air reservoir, which is united to the two wheels of the trailer by a conduit 7 and branch conduits 8 and 9 leading to the right and left rear wheels 5R and 5L of the trailer respectively. The wheels 4 of the tractor are connected to the reservoir 6 by conduits 10. Any suitable arrangement of valves for the conduits or brake lines and pumping means for maintaining the fluid in the tank 6 under pressure, will be included in the brake system. Such systems are of course well-known and are not part of this invention. Whenever the brakes are to be used the driver merely opens the proper valves so that fluid from the tank can enter the conduits 7, 8, 9 and 10. Usually there is a valve that can be actuated by the driver's foot when the brakes are to be put on all the wheels at once; and another valve to be operated by hand when only the wheels 5R and 5L are to be checked or stopped.

The tractor also carries a battery or other suitable source of electrical energy 11, one end of which is grounded at 12 and the opposite pole thereof is connected to a rotary switch blade 13 of conductive material, which can make contact with either one of a pair of terminals 14 and 15. All terminals and switches are of course placed within easy reach of the driver in the tractor 1. The terminal 14 is connected by electrical conductor 16 to a casing 17 preferably near the wheel 5R, and this casing contains a solenoid for actuating a magnetic plunger to close a normally open valve in the conduit 8 leading to the wheel 5R. The other terminal 15 is connected through a similar electrical conductor 18 leading to a casing 19 near the wheel 5L and also containing a solenoid for actuating a similar valve in the conduit 9.

Hence, whenever the truck has to be backed against the loading platform, and the driver has to make a short turn, he moves the switch 13 to close a circuit through one or the other of the terminals 14 or 15, so as to be able to hold motionless one of the rear wheels of the trailer 2. If, for example, the front of the trailer is to be swung around to the right when backing, the wheel 5L must be locked, and the switch 13 is moved over to engage the terminal 14. The battery then energizes the magnet in the casing 17, current flowing through the line 16, and the magnet in the casing 17 closes the valve therein and obstructs the conduit 8 so that the brake cannot be tightened on the wheel 5R. But the power fluid released from the tank 6 now can act through the conduit 9, of which the valve in the casing 19 is left open, and the pressure of the fluid in conduit 9 will put the brake securely on the wheel 5L. This wheel 5L then acts as a pivot point to hold left rear corner of the trailer stationary; and the front of the trailer 2 can be swung around to the right by the tractor in a very short turn to convenient position, for loading or unloading. The rear end of the trailer then turns in a clockwise direction about the wheel 5L.

If, on the other hand, the short turn to the rear is to be made by swinging the front of the trailer to the left, the switch 13 is moved to engage the terminal 15 and current then flows through the line 18 to the casing 19 to close the valve therein and obstruct the line 9; while the conduit 16 is not obstructed because the valve in the casing 17 remains open, the wheel 5L is left free to turn, and the wheel 5R is held by its brake. The trailer then pivots around the wheel 5R in a counter-clockwise direction.

With this arrangement, so long as sufficient brake fluid is available for the conduits 7, 8 and 9, the driver as before can check or lock either rear wheel by pressure fluid in one or the other conduits 8 or 9 to check or hold one wheel, but leaving the other wheel free to turn by blocking the conduits leading to the one wheel with the magnet and valve in one casing 17 or 19.

However, the couplings of the conduits 7, 8 and 9 sometimes become impaired; especially the conduit 7 adjacent the tank 6 at coupling 3; and in such case, no pressure fluid can be suplied to the trailer wheels, and the brakes for the wheels 5R and 5L become useless. Lack of pressure fluid may also be caused by a failure of the pump. I, therefore, provide solenoids connected to the actuating arms of the rear brakes, so that either wheel 5R or 5L can be checked while the other is left free as before. For this purpose, another pair of switch terminals 21 and 22 are mounted on the tractor near the driver's seat and these terminals are connected to wires 23 and 24 respectively leading to the rear wheels 5R and 5L. Cooperating with these terminals 22 and 23 is the rotary switch 25, also connected to battery 11 by a lead 26', and this switch may be moved into engagement with either terminal 21 and 22 so as to actuate the brake for either rear wheel on the trailer for backing and turning, as above described. For example, if the switch 25 is swung to engage the terminal 21, the wheel 5R can be locked while the other wheel is left free; and if the switch is swung to engage the terminal 22, the electrical attachments for the wheel 5L can be operated to lock this wheel and leave the wheel 5R free to turn. Hence, the trailer can be controlled as before the make either a right or left part turn to the rear. Resistances or rheostats 26 joined to terminals 21 and 22 may be included in the lines 23 and 24, if desired, so that either rear brake may be put on by the current from the battery gradually by movement of the switch 15 slowly along the rheostats, or quickly by swinging the switch 25 smartly to the end of either one of the rheostats 26. Such rheostats may also be utilized with the terminals 14 and 15.

The brakes may comprise drums to be encircled by brake bands of the usual construction and arranged to be tightened by the effect of fluid in a combined accumulator and brake chamber 27—28 one at the end of each conduit 8 and 9. See FIGURE 3. The solenoid casings 17 and 19 will be located near said parts 27—28, and each rod 29 from a chamber 28 to the levers 30 which tighten the brake bands for the wheels 5R and 5L will have a magnet 31 and armature 32 in such position that when the solenoids are energized, these levers 30 will be pulled in the same direction as when the fluid in the parts 27—28 moves the arms 29. The magnets 31 are mounted on the casings 28 by supports 33'.

Further, if the truck is rolling downhill with all hose lines 8, 9 and 10 intact and sufficient brake fluid available, and the trailer begins to swing sidewise in either direction, for example, to the left, as shown in FIGURE 2, the driver can stop the swing and force the trailer back into correct alinement with the tractor by admitting pressure fluid through the conduits 7 and 8 so as to check the wheel 5R; but the other wheel is left free to turn, and the trailer is thus pivoted around its coupling 3 and straightened out.

In the case of failure of brake-operating fluid, so that the brakes on the trailer cannot be put on by fluid in the conduits 8 and 9, the same result can be obtained by means of the switch 25 and the electrical connections associated therewith. Thus, if the driver wants to check the "jack-knifing" of his rear truck and should turn the switch 13 with the idea of obstructing one of the lines 16 and 18 by means of the solenoid in the casing 17 or 19, and then finds that the fluid will not work, he moves the switch 25 to engage one of the terminals 21 or 22. Either rear wheel 5R or 5L can then be checked or stopped by current flowing to the accumulator and brake chamber casing adjacent one rear wheel as required.

Also, with all parts of the system for the brake fluid in full operative condition, all the necessary operation of the brakes can be done by the fluid supplied from the tank 6; but failure of said system may occur as above described. In such case, other electrical circuits can be utilized to cause current to flow through the lines 23 and 24 simultaneously, to make the brakes hold both rear wheels 5R and 5L. Such circuits comprise a third pair of terminals 34 and 35, one of which is connected by a lead 36 to the conductor 23 and the other connected by a lead 37 to the line 24. A sliding switch bar 38, also connected by a lead 39 to one terminal of the battery 11, can be moved to engage both terminals 34 and 35; and thus current will now flow through both lines 23 and 24 to magnets 33 and cause the brakes to act on the rear wheels 5R and 5L. Then both these brakes can be tightened at once. A rheostat 40 in each line 36 and 37 can be connected to each terminal 34 and 35 so that the brakes can be put on gradually.

Another pair of terminals 41 on the opposite side of the switch 38 are so arranged that the resistances 40 can be bypassed if the brakes are to be applied quickly. One of these terminals 41 is connected to the wire 36, and conductor 23, and the other terminal 41 is connected to the conductors 37 and 24. Hence, if the switch 38 is moved to bridge the two terminals 41, current will flow around the rheostats 37 to both brakes on the rear wheels of the tractor and check or stop these wheels quickly.

Thus, if the fluid pressure system for the brakes on the rear of the trailer is ever rendered inoperative, the electrical connections controlled by the switch 25 and another described below, permit driving to be continued with safety.

FIGURE 2 shows diagrammatically the position of a trailer if the same should swing or "jack-knife" to the left. In this situation, the driver should check or stop the wheel 5R and leave the wheel 5L free. He turns the switch 13 to engage the terminal 15 and current through the line 18 to the solenoid valve at the casing 19 will obstruct this line 9; while the other line 8 will not be obstructed, and the brake can be put on the wheel 5R, thus creating a drag on the wheel 5R to swing the rear end of the truck over to the right into line with the tractor 1. If, however, the conduits 7, 8 and 9 cannot then be used, the driver merely moves the switch 25 until it engages the terminal 21 and current then will flow from the battery through the line 23 and lock the rear wheel 5R as before. If the swing is to the right, the switch 13 or 25 then used will be moved to make contact with the other terminal 15 or 22.

The power fluid brake system can be rendered ineffective for the rear wheels of the trailer by damage to the conduits 7, 8 or 9, and the couplings thereof, or by impairment of the pump as above stated. Also in cold weather, freezing of moisture can so affect the conductive lines for the fluid and the couplings therein with the same result. My controlling system supplements the brake power fluid system so that whenever the apparatus for supplying power fluid to the brakes becomes unserviceable, the electrical connections will serve all purposes in ordinary driving, backing and the correction of "jackknifing."

With my electrical connections for energizing the magnets 31 to put on the brakes, the casings 17 and 19 with the valves therein, and the electrical connections to operate the valves in said casings, can be omitted.

Modern trucks have batteries that will generate as high as 24 volts and such a battery or even a smaller one will answer the purpose of supplying enough current to operate the brakes. Also in regular driving the battery of course is so connected to the generator that, during the operation of the engine when the truck is in motion, the generator itself will furnish the necessary electrical power to operate the brakes, the battery being charged by the generator in the usual way and disconnected to prevent overcharging.

Having described my invention, what I believe to be new is:

1. An automotive vehicle comprising a tractor and a trailer pivotally coupled to the tractor, the trailer having a rear wheel and brake therefor at each side, a fluid supply conduit leading to each of said wheels, a member connected to each conduit and mounted adjacent each of said brakes to be actuated by fluid in said conduit to operate each of said brakes, each conduit having a casing for containing a valve to close said conduit so as to cut off the supply of fluid to said members, a source of electrical energy on said vehicle, an electrical connection from said source to each of said casings, a switch coupled to close the circuit through each of said connections to either casing to prevent fluid from operating one of said brakes, other electrical connections from said source to said members, a second switch connected to said source to close the circuit through each of said second-named connections, and a third switch in multiple with said last-named switch connected to said source and to said last-named connections and arranged to close the circuit through both of said last-named connections to operate both of said members.

2. An automotive vehicle comprising a tractor and a trailer pivotally coupled to the tractor, the trailer having a rear wheel and brake therefor at each side, a fluid supply conduit leading to each of said wheels, a member connected to each conduit and mounted adjacent each of said brakes to be actuated by fluid in said conduit to operate each of said brakes, each conduit having a casing for containing a valve to close said conduit so as to cut off the supply of fluid to said members, a source of electrical energy on said vehicle, an electrical connection from said source to each of said casings, a switch coupled to close the circuit through each of said connections to either casing to prevent fluid from operating one of said brakes, other electrical connections from said source to said members, a second switch connected to said source to close the circuit through each of said second-named connections, and a third switch in multiple with said last-named switch connected to said source and to said last-named connections and arranged to close the circuit through both of said last-named connections to operate both of said members, and variable resistance means in circuit with each of said switches to regulate the current in said connections.

References Cited in the file of this patent

UNITED STATES PATENTS

| | | |
|---|---|---|
| 1,210,444 | Fallek | Jan. 2, 1917 |
| 1,661,622 | Pieper | Mar. 6, 1928 |
| 1,896,963 | Leventis | Feb. 7, 1933 |
| 2,169,668 | Thomas | Aug. 15, 1939 |
| 2,367,194 | Boldt | Jan. 16, 1945 |
| 2,442,601 | House et al. | June 1, 1948 |
| 2,670,817 | Tripp | Mar. 2, 1954 |